UNITED STATES PATENT OFFICE.

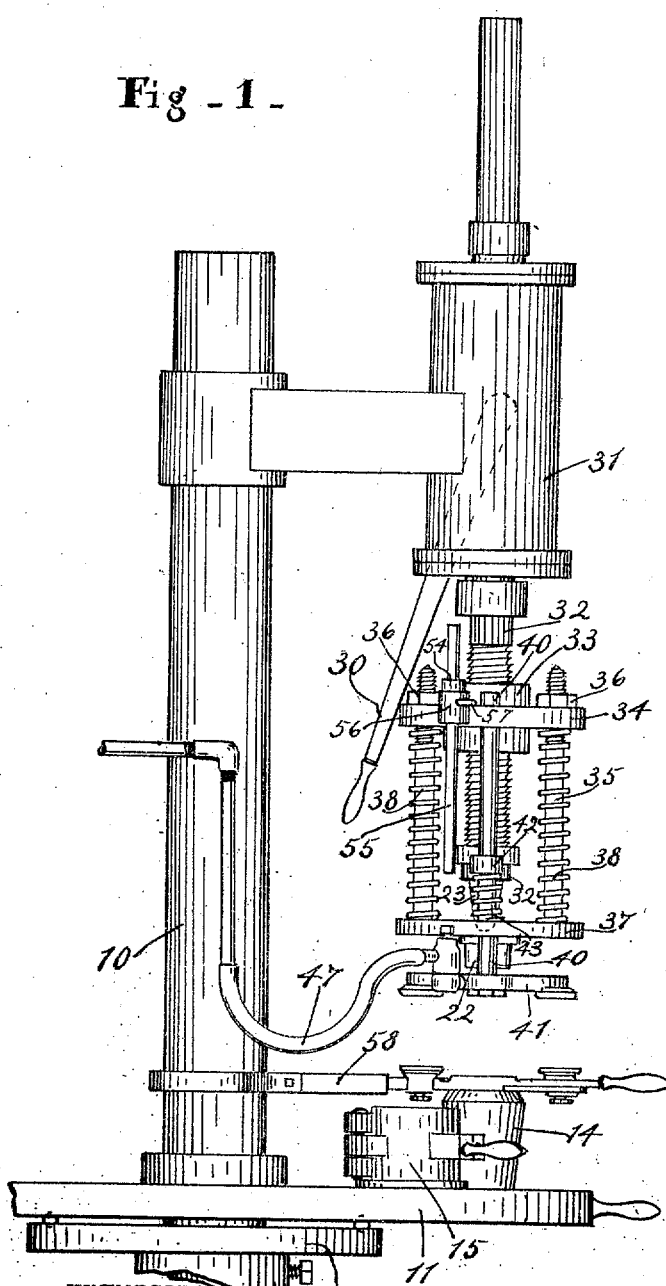

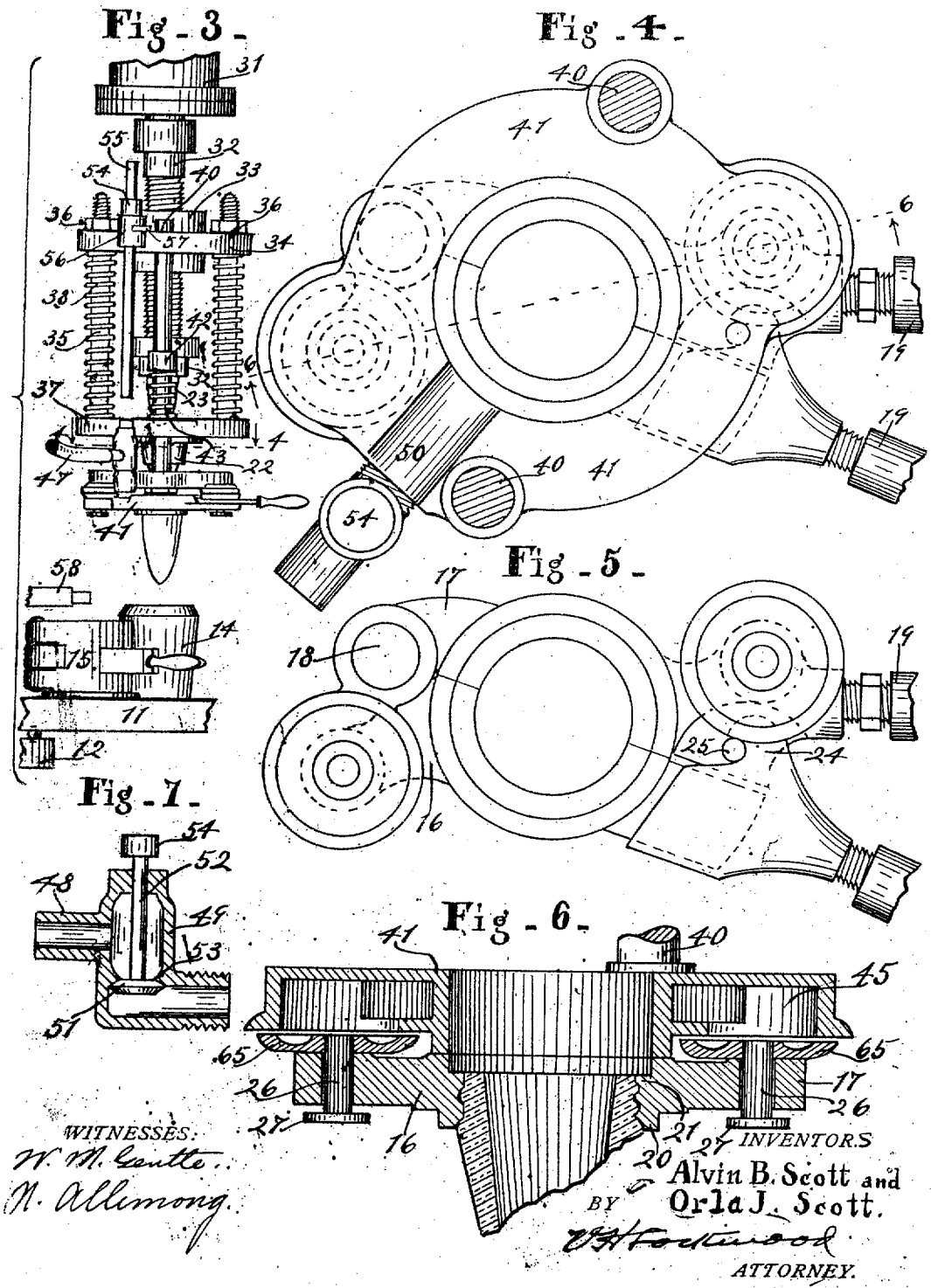

ALVIN B. SCOTT AND ORLA J. SCOTT, OF SUMMITVILLE, INDIANA, ASSIGNORS TO MODEL GLASS WORKS, OF SUMMITVILLE, INDIANA, A CORPORATION OF INDIANA.

MACHINE FOR MAKING HOLLOW GLASSWARE.

No. 863,946.          Specification of Letters Patent.          Patented Aug. 20, 1907.

Application filed October 18, 1906. Serial No. 339,499.

To all whom it may concern:

Be it known that we, ALVIN B. SCOTT and ORLA J. SCOTT, of Summitville, county of Madison, and State of Indiana, have invented a certain new and useful Machine for Making Hollow Glassware; and we do hereby declare that the following is a full, clear, and exact description thereof, reference being had to the accompanying drawings, in which like letters refer to like parts.
The object of this invention is to provide means for using a vacuum or suction to elevate the lift-over and suspended glass blank out of a press mold in a machine for making hollow glassware, and to hold the same in this elevated position until the operator is ready to take hold of the lift-over and transfer it to the blow-mold. In connection with this feature of the invention there is a valve-controlled means operable by the plunger-actuating means for causing and also for shutting off the vacuum or suction so as to render said mechanism automatic.

Heretofore hooks and other mechanical means have been employed for grasping or engaging the lift-over and elevating the same. These hooks, however, are troublesome to operate and are always in the way and are not sufficiently positive or accurate.

The nature of the invention will be understood from the accompanying drawing and the following description and claims.

In the drawings Figure 1 is an elevation of a portion of a machine for making hollow glassware showing the plunger-actuating mechanism and one set of molds, the mold table and some other parts being partially broken away and the various parts being in their unoperated position at the time of charging the press mold with glass. Fig. 2 is an elevation of the right-hand portion of Fig. 1, showing the parts while the glass blank is being pressed in the press mold. Fig. 3 is an elevation of the lower part of the mechanism shown in Fig. 2 with the plunger elevated and the lift-over and glass blank lifted out of the press mold by the suction means, the parts being in their position just prior to the release of the lift-over. Fig. 4 is a horizontal section on the line 4-4 of Fig. 3 but on a larger scale. Fig. 5 is a plan view of the lift-over, the handles being partly broken away. Fig. 6 is a vertical section of the suction head, the lift-over and the glass blank on the line 6—6 of Fig. 4, said blank being partly broken away. Fig. 7 is a vertical section centrally through the suction valve mechanism.
In detail the machine is provided with a central tubular frame 10 carrying a mold table 11 that is revoluble on a stationary plate 12, which is held in position by a collar 13 on the lower part of the frame 10. Upon the table 11 there is mounted a press mold 14 and a blow-mold 15. In the complete machine there are several sets of these molds positioned on a line concentric with the axis of the table 11.

Upon the press mold there is placed a lift-over, shown in Figs. 5 and 6. It consists of two members 16 and 17 pivoted together by the pin 18, and each member at its outer end is provided with a handle 19, but the body of each member 16 and 17 is provided with a semicircular opening surrounded with a lower flange 20 adapted to fit in a corresponding recess in the mouth of the molds and a shoulder 21 on the upper side to furnish a seat for the shoulder 22 at the upper end secured on the underside of a disk 37. Said members 16 and 17 of the lift-over have also a catch 24 on one member adapted to engage a pin 25 on the other, as seen in Fig. 5, for locking the parts together in a closed position. Each part of the lift-over carries a suction plate 65 on the upper end of a central downwardly extending stem 26 that passes loosely through a hole of the lift-over member, and has a disk 27 at the lower end. And this arrangement is so made that the plate 65 will have some vertical play.

After the lift-over is placed upon the press mold, the latter is charged with glass by a gatherer, and then the plunger is actuated by throwing the lever 30 to the right from the position in Fig. 1 to that in Fig. 2, which, with suitable means in connection with the compressed air cylinder 31, forces downward the plunger rod 32 on the lower end of which the plunger 23 is located. The lower portion of said plunger rod is threaded so as to carry an adjustable collar 33 to which a disk 34 is secured. Through this disk guide rods 35 extend that have an adjustable nut 36 on the upper end of each, and at their lower ends are secured to the disk 37. Each guide rod 35 has a spring 38 wound spirally about it between the disks 34 and 37 that tends to force the disk 37 downward yieldingly when the plunger rod is moved downward.

A pair of guide rods 40 pass loosely through the disks 34 and 37 and at their lower ends are secured to a suction head 41. A collar 42 is secured on each rod 40 in such position that it will serve as a stop for the spring 43. The spring 43 on the rod 40 between the disk 37 and the collar 42 is to prevent the jar of the upwardly moving plate 37.

The suction head 41 is in the nature of a hollow annular ring, shown in Fig. 6, the hollow portion forming an annular chamber 45 with suction openings in the underside adapted to register with and be covered and closed by the suction plates 65 on the lift-over, so that when air is exhausted from the chamber 45, said plates 65 will be held air-tight to the underside of the suction head 41 and thus elevate the lift-over when the suction head is elevated. Air is exhausted from said chamber 45 by any suitable means acting through the tube 47 that is connected with the portion 48 of the valve casing 49, which is screwed into the portion 50 of the suction head so as to communicate with the suction chamber. This passageway is closed by the valve 51 on the stem 52 in the valve casing, said valve moving upward under the influence of suction into position against its seat 53 in said casing. The stem 52 has a head 54 that limits the opening movement of the valve, and said valve is opened by the downward movement of the rod 55 which at its lower end engages the head 54 on the stem of the valve and depresses the valve. This occurs when the plunger is depressed from the position shown in Fig. 1 to that shown in Fig. 2.

After the valve has been opened so as to cause the suction, it remains open during the upward movement of the plunger from the position shown in Fig. 2 to that shown in Fig. 3. In Fig. 3 the parts have reached their highest position prior to the release of the lift-over. Said valve-controlling rod 55 operates loosely in the sleeve 56 secured to the plate 34, and there is a collar 57 fastened to the rod 55 above the sleeve 56 to cause said sleeve 56 to lift the rod 55 off of the valve stem in the beginning of the upward movement of the plunger.

The lift-over will be held pneumatically in the upward position until it is removed by the operator. The lift-over is removed by giving one of the handles a slight lateral movement which causes a disk 65 to uncover an opening or port in one suction chamber 45. Then the inrush of air passing through the valve casing 49 will automatically close the valve 51. An arm 58 is secured to the tubular frame 10 for positioning the lift-over and holding it in place on the press mold.

What we claim as our invention and desire to secure by Letters Patent is:

1. In apparatus for manufacturing glass, the combination of a glass-supporting part and a suction-head having a suction-opening arranged for making connection with said glass-supporting part for supporting the latter.

2. In apparatus for manufacturing glass, the combination with a plunger, of a support moving therewith, a suction-head supported from the latter and yielding with relation thereto, and a glass-support, said suction-head having suction connection with said glass-support.

3. In apparatus for manufacturing glass, the combination with a plunger, of a support moving therewith, a suction-head supported from the latter and moving therewith and also yielding with relation thereto, and a glass-support, said suction-head having releasable suction-connection with said glass support.

4. In apparatus for manufacturing glass, the combination of a suction-head and a glass-support, said suction-head having releasable suction-connection with said glass-support.

5. In apparatus for manufacturing glass, the combination of a plunger-head, a suction-head, a glass-support, said suction-head having suction-openings whose suction is arranged to act on said glass support for supporting the same, and rods and springs therefor for supporting said suction-head from said plunger-head.

6. In apparatus for manufacturing glass, the combination of a plunger, a plunger-head, a follow-ring thereon, a suction-head having an opening therethrough, and a glass-support, said follow-ring engaging said glass-support through said opening.

7. In apparatus for manufacturing glass, the combination with a plunger of a vacuum head, a glass-support, said head having vacuum connection with said glass-support, and means for causing movement of said vacuum head with and relatively to said plunger.

8. In a machine for making hollow glassware, the combination with a press mold, a blow mold, and a lift-over that fits on the press mold, of a movable suction head for engaging and removing the lift-over from the press mold.

9. In a machine for making hollow glassware, the combination with a press mold, a blow mold, and a horizontally disposed lift-over that fits on the press mold, and is provided with a handle, of a horizontally disposed movable suction head for engaging and removing the lift-over from the press mold, whereby said lift-over may be released from said suction head by the lateral movement of the handle of the lift-over.

10. In a machine for making hollow glassware, the combination of a press mold, a blow mold, and a lift-over adapted to engage the press mold, of a plurality of suction plates thereon, and a movable suction head provided with suction openings adapted to register with and be closed by the suction plates on the lift-over, whereby the lift-over will be removed from the press mold.

11. In a machine for making hollow glassware, the combination of a press mold, a blow mold, a plunger for the press mold, means for operating the plunger, and a lift-over adapted to fit on the press mold, of a suction head connected with and moved by the means for moving the plunger and that is adapted to engage and remove the lift-over from the press mold.

12. In a machine for making hollow glassware, the combination with a press mold, a blow mold, and a lift-over adapted to fit on the press mold, of a plurality of suction plates mounted on said lift-over in opposite positions and so as to have slight vertical play, and a vertically movable suction head provided with suction openings adapted to register with and be closed by the suction plates on the lift-over, whereby the lift-over will be elevated away from the press mold.

13. In a machine for making hollow glassware, the combination with a press mold, a blow mold, and a lift-over, of suction plates on said lift-over, a movable suction head with a chamber therein having suction openings adapted to register with and be covered by said suction plates, and means for exhausting air from said suction chamber.

14. In a machine for making hollow glassware, the combination with a press mold, a blow mold, a lift-over adapted to fit on the blow mold, a plunger, and mechanism for operating the plunger, of a suction head adapted to engage and remove said lift-over, means for exhausting air from the suction head, and means connected with the plunger-actuating mechanism for controlling the exhaust of air from said suction head.

15. In a machine for making hollow glassware, the combination with a press mold, a blow mold, a lift-over adapted to fit on the blow mold, a plunger, and mechanism for operating the plunger, of a suction head adapted to engage and remove said lift-over, means for exhausting air from the suction head, a valve for controlling the exhaust of air from said suction head, and means mounted in connection with the plunger-operating mechanism that opens said valve when the plunger is actuated.

16. In a machine for making hollow glassware, the combination with a press mold, a blow mold, a lift-over adapted to fit on the blow mold, a plunger, and mechanism for vertically operating the plunger, of a suction head adapted to engage and elevate said lift-over, means for exhausting air from the suction head, a valve for controlling the exhaust from said suction head, a gravity-controlled rod loosely mounted in the means for operating the plunger, and a stop collar on said rod in position to lift said rod off the valve at the beginning of the upward movement of the plunger mechanism, whereby the lift-over will be elevated and held until removed.

In witness whereof, we have hereunto affixed our signatures in the presence of the witnesses herein named.

ALVIN B. SCOTT.
ORLA J. SCOTT.

Witnesses:
W. R. MURRAY,
ELLWOOD O. ELLIS.